United States Patent
Youngblut (10) Patent No.: US 12,352,538 B2
(45) Date of Patent: Jul. 8, 2025

(54) LIGHT REFLECTANCE MATCHING CAMOUFLAGE SYSTEM

(71) Applicant: Darrin Youngblut, Jesep, IA (US)

(72) Inventor: Darrin Youngblut, Jesep, IA (US)

(73) Assignee: Code of Silence, LLC, Jesup, IA (US)

( * ) Notice: Subject to any disclaimer, the term of this patent is extended or adjusted under 35 U.S.C. 154(b) by 373 days.

(21) Appl. No.: 17/889,220

(22) Filed: Aug. 16, 2022

(65) Prior Publication Data

US 2023/0050975 A1 Feb. 16, 2023

Related U.S. Application Data (60) Provisional application No. 63/233,615, filed on Aug. 16, 2021.

(51) Int. Cl.
*G01J 3/46* (2006.01)
*F41H 3/02* (2006.01)
*G02F 1/00* (2006.01)
*G02F 1/19* (2019.01)

(52) U.S. Cl.
CPC ............... *F41H 3/02* (2013.01); *G01J 3/463* (2013.01); *G02F 1/0063* (2013.01); *G02F 1/19* (2013.01)

(58) Field of Classification Search
CPC ... F41H 3/02; G01J 3/463; G02F 1/19; G01N 21/0063
See application file for complete search history.

(56) References Cited

U.S. PATENT DOCUMENTS

| | | | |
|---|---|---|---|
| 2007/0034774 A1* | 2/2007 | Blake | F41H 3/00 250/206.1 |
| 2016/0012158 A1* | 1/2016 | Smith | F41H 3/02 703/1 |
| 2018/0066922 A1* | 3/2018 | Howland | B32B 23/10 |

FOREIGN PATENT DOCUMENTS

KR         20190121595 A   * 10/2019

* cited by examiner

*Primary Examiner* — Tarifur R Chowdhury
*Assistant Examiner* — Joshua M Carlson
(74) *Attorney, Agent, or Firm* — Messner Reeves LLP (57) ABSTRACT

An article of manufacture comprises a surface that includes a first region and a surface treatment over the first region. The first region includes a depiction of a real-world object and the surface treatment exhibits a first light reflectance value. The real-world object exhibits a second light reflectance value, and the first light reflectance value is within 30 percent of the second light reflectance value. The article of manufacture may include an article of clothing or a durable good.

5 Claims, 7 Drawing Sheets

LIGHT REFLECTANCE MATCHING CAMOUFLAGE SYSTEM

CROSS REFERENCE TO RELATED APPLICATIONS

This application claims priority to U.S. Provisional Patent Application No. 63/233,615 filed on Aug. 16, 2021, the entire contents of which are incorporated herein by reference.

FIELD OF THE DISCLOSURE

The present disclosure generally relates to a camouflage system and articles of manufacture, such as clothing and hard goods, exhibiting surface ornamentation having selected light reflectance properties.

BACKGROUND OF THE DISCLOSURE

Camouflage techniques are used to obscure objects for the purpose of decreasing or preventing detection. One camouflage technique involves constructing objects having certain surface patterns. These patterns are designed to blend into the environment and conceal the object from visual detection.

SUMMARY OF THE INVENTION

According to some examples of the present disclosure, an article of manufacture comprises a surface that includes a first region and a surface treatment over the first region. The first region exhibits a first light reflectance value. Real-world objects and environments exhibit a second light reflectance value. The first light reflectance value is within 30 percent of the second light reflectance value. The article of manufacture may include an article of clothing or a durable good.

In an embodiment, an article of manufacture for providing camouflage in an environment includes a surface that includes a first region. The first region exhibits a first light reflectance value. The environment exhibits a second light reflectance value, and the first light reflectance value is within 30 percent of the second light reflectance value.

In an embodiment, a method includes determining a first light reflectance value associated with a target environment of an article of manufacture and controlling a second light reflectance value of the article of manufacture so that the second light reflectance value is within 30 percent of the first light reflectance value.

These and other aspects, objects, and features of the present invention will be understood and appreciated by those skilled in the art upon studying the following specification, claims, and appended drawings.

DETAILED DESCRIPTION

Figure 1:
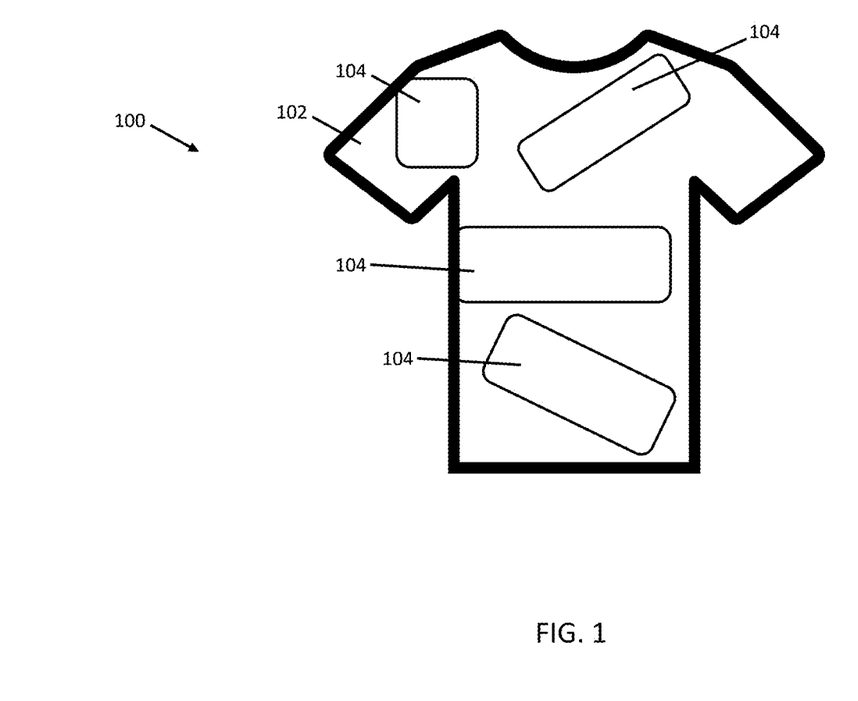
FIG. 1 depicts an article of manufacture including a garment having regions depicting real-world objects where the objects are depicted on the garment using surface treatments having light reflectance values that match light reflectance values of the real-world object.

For purposes of description herein, the terms "upper," "lower," "right," "left," "rear," "front," "vertical," "horizontal," and derivatives thereof shall relate to the example of FIG. 1. However, it is to be understood that the assembly provided herein may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Camouflage materials have long been used in the manufacturing of numerous outdoor products. Blinds, camouflage clothing and almost all products and articles of manufacture used in hunting, and animal or bird watching, as well wildlife photography, utilize camouflage patterns or natural looking colors in their construction to create a more natural appearance and therefore help conceal the user and/or their equipment from detection by animals and birds.

Despite the popularity of commercial camouflage designs in general (and camouflage surface materials that utilize these camouflage designs), the effectiveness of these camouflages has long been debated. While the outdoor industry has been dominated by the theory that camouflage designs assist outdoorsmen and outdoorswomen in getting closer to animals and remaining undetected by wildlife for almost 40 years, many outdoor enthusiasts and experts still strongly disagree that camouflage techniques and specifically camouflage materials are actually effective in their intent. In fact, many hunting clothing manufacturing companies are aware of this concern, and for example, and have converted their products into "non-camouflage" (solid color) versions which saves cost and also makes many consumers feel like they are not wasting their money on non-effective cost adding camouflage colorations. These "non-camo" versions of products have become very popular recently and are an indication that consumers are suspect of the value of conventional camouflage approaches.

The present disclosure present solutions and approaches for implementing and designing camouflage patterns and surface treatments that mitigate some of the problems associated with conventional camouflage approaches. Specifically, this disclosure presents various technological improvements enabling the creation of camouflaged articles of manufacture where camouflage patterns thereon are more effective at mimicking natural environments as compared to conventional approaches. As such, the present disclosure provides solutions that can improve the effectiveness of materials using camouflages and/or colorations by changing the way these surface materials are being perceived by wildlife.

Conventionally, camouflage surface materials used in the manufacturing of outdoor products (whether upon two-dimensional or three-dimensional surfaces) typically target three main "concepts" or "techniques" in their design strategy (or a combination of any these three "concepts/techniques"). These three "concepts/techniques" being: color(s), shape mimicry of natural objects found in nature (leaves, trees, etc.), and also "visually disruptive" style design techniques such as utilizing "distortive components" in their design such as large "line type elements", "large components" or possibly "sharp contrasts" to the elements within the design to help destroy the outline of a human or an outdoor product. Some camouflage clothing, such as Ghillie suits, are arranged to allow natural objects (e.g., sticks, leaves, and grass) to be attached to the clothing to provide some natural camouflage. But such clothing also relies on surface treatments to provide comprehensive camouflaging effect.

While the visual appearance of products or materials utilizing conventional camouflage designs may, to a human, appear very similar to natural objects and environments and therefore appear being very capable of concealing the presence of a human or an outdoor product, the "Light Reflectance Value" (LRV) of these surfaces is meaningfully different than the natural background and/or objects(s) they are attempting to mimic or hide a human or an object in. As such, a real-world object that is depicted in a camouflage pattern may have very different light reflectance properties than the real-world object would exhibit in nature. Consequently, although the real-world object depicted in the camouflage design may appear, superficially, to have the same appearance as that same real-world object, in the field, the real-world object as depicted in the camouflage design may be appear markedly than the real-world object itself. Therefore, this difference in LRV between materials used in outdoor products and the LRV of actual natural objects found in nature and/or natural scenarios is meaningfully different, the effectiveness of camouflages and/or colors used in outdoor products may not provide effective concealment.

Accordingly, the present disclosure provides a camouflage system in which the LRV of natural objects and natural scenarios are measured. Additionally, the LRVs of materials used in the surface ornamentation or the general construction of outdoor products (e.g., hard goods and clothing) are measured. With the LRV values determined, the camouflage system calls for the LRV of materials used in the manufacturing of outdoor products to be matched to the LRV of natural objects and natural scenarios or environments. With substantially matched LRVs, the true visual similarity of these two subjects is improved to assist outdoor products in their ability to be undetected by wildlife.

In an embodiment, substantially all materials used in the manufacturing of the visible surfaces of outdoor products may appear more consistent with natural objects and environments in the view of animals and birds by closely matching the LRV values found in natural objects and environments with the LRV of such materials used in the construction of the surfaces of outdoor products and clothing.

In embodiments, the present LRV-matching camouflage system may be utilized in accordance with all camouflage materials (all fabrics, plastics, paints, and other materials) used in products designed to disguise the presence of humans from animals and/or birds, and/or hide the presence of humans from animals or birds through enclosure of a human. This camouflage system assists a material or a surface of an object to provide an improved camouflage affect. Therefore, any outdoor product that utilizes a material in its exterior surface and/or construction or uses a coating (or similar) of any type for the purpose of improving its ability to mimic a natural surrounding and/or conceal humans from wildlife, is therefore benefitted by this invention.

In implementing the present camouflage system, the LRV of a natural object and/or natural scenario is measured and becomes a target for the LRV of the material being used to mimic the LRV of these same natural objects and scenarios in a camouflaged article of manufacture. This can improve the camouflaging effect, because even though a fabric with a camouflage design and a specific coloration may appear to be visibly similar to the actual natural object or natural environment it was intending to mimic, if the LRV of the fabric is different than the actual object or actual environmental scenario, the two will appear much different in the eyes of wildlife. It is these differences in LRV of the surfaces of outdoor clothing and products and the actual LRV that is creating much of the ineffectiveness of conventional camouflage surfaces used in outdoor products today. In measuring and understanding the LRV of natural objects and scenarios, products can be made to more effectively mimic natural objects and scenarios to a much higher degree than they are currently and therefore allow humans and their equipment to remain undetected by wildlife to much higher degree than is currently happening.

Objects are visible due to the color and amount of visible light that they "reflect". Various means exist to measure this "reflectivity" but the reflectivity of an object in a consistent light scenario is semi-constant as well as semi-consistent. Since light reflectivity defines what humans and animals see, to make effective camouflage, the LRV of a camouflaged material should be aligned with the LRV of the corresponding natural object or environment in which the camouflaged object is designed or intended to work in.

The LRV of any surface is actually the "inverse" of the amount of light that is "absorbed" by that surface. For example, if 10 percent (%) of an amount of light that is projected on a surface of a particular object of a particular color/texture is "absorbed", then it is generally accurate to say that the remaining 90% of the projected light is "reflected".

Two main types of light reflectance are recognized. The first type is known as "specular" reflection. Specular reflection is the more "direct" or "directly reflective" form of light reflection (mirror type) and is more "directional" and is typically at the "same angle" of the projected light. Noting that colors commonly found in our "common" and immediate world typically reference a particular LRV number (1-100; such as paint colors for example), these LRV ratings generally assume a "straight on" (or 90 degree angle) of viewing to the surface/color, assume a flat or semi flat surface, and reference the amount of light that is reflected "specularly" away from the surface. Note that "true and complete black" (full complete color—which is very hard to produce) will absorb 100% of the light pushed toward it and "true complete white" (actual true "zero" color) will reflect 100% of the light impinging upon it, hence, the benefit and common application of basic specular LRV metrics to define various colors within the color spectrum.

The other accepted and commonly referenced form of light reflection is "diffuse" reflection which is the "total reflection" of all light from a surface in multiple directions or "total reflection" (sum of all light reflected in all directions, including specular reflectance of the subject as a subset of the diffuse reflectance). As mentioned previously, "truly flat" surfaces are rare and hard to create but none the less, "specular" reflection is still the more commonly used form of defining and measuring light reflection. However, as most surfaces are not actually, "truly flat", light is actually typically reflected from these surfaces in a "diffuse manner" and therefore the light is perceived by the viewer is actually in a "diffuse" perspective.

As light reflectance pertains to the present disclosure, most natural objects (particularly those found in nature) should be measured for their "diffuse" form of light reflectance to truly understand and define their performance in terms of a valid and representative light reflectance value to define how these colors are being perceived and/or visually processed by animals and birds. Diffuse reflection is however more difficult to measure and hence why specular reflection is the more "common" form of light reflection that is referenced and utilized in the "common world". Regardless of how light reflectance is measured or considered, in the present disclosure various measurement techniques, LRV metrics, and forms of measurement are contemplated in this disclosure.

Various methods and techniques of measuring both specular and diffuse light reflectance exist. Specular light reflection is commonly measured by colorimeters, luminance meters, "LRV meters", Luxmeters, and even more common devices such as light meters on photography equipment, among others. Diffuse light reflection is typically measured by instruments that can measure complete and holistic light reflectance such as spectro-radiometers, spectrophotometers (spherical forms), and sophisticated versions of colorimeters among others. Most measuring devices accepted for the measurement of diffuse light reflection can be used for measurement of specular light reflection but the opposite is not generally true however, particularly when higher levels of accuracy and consistency are necessary.

Multiple factors go into creating an LRV performance from a subject material that contributes to the LRV of the subject material. In general, natural objects are porous and therefore have an aptitude to absorb more light or diffusely reflect more light than non-porous objects of the same or similar color, particularly when considering diffuse light reflection metrics.

A few general principles that may affect the ability of a subject material to effectively mimic the LRV of natural object are as follows. In general, the more "unnatural" components/dynamics that are added to the subject material, the more difficult the task of matching naturally found LRVs'. For example, printing techniques on fabrics that use a large amount of ink and/or dye stuffs create LRV dynamics that can differ significantly from the LRV characteristics of natural objects. In contrast, dying of fabrics can create far fewer unnatural light reflection dynamics than does printing due to many factors with the amount of dye/ink stuffs required to conduct these operations being meaningful. In a general sense, the more unnatural the components and dynamics that are used in the construction of a subject material, the bigger the challenge in delivering an LRV performance that is aligned with a natural object and again, the opposite is however true as well.

The more one utilizes natural (organic) materials in the construction of a subject material, the easier the process of LRV mimicry of natural objects is and vice versa. For example, using fibers in fabrics or substrates such as wool, cotton or hemp provides LRV's more consistent to the LRVs of natural objects (and even more so when mimicking objects made of the same type of materials). The opposite is generally true when synthetic materials are potentially utilized in fabrics/substrates and in general, this makes it harder to mimic the LRV's of natural objects.

This same type of principle regarding the efficiency of LRV mimicry applies to surface textures as well. Porous versus "non-porous" dynamics apply where mimicking LRV's of porous type of materials is best accomplished with porous type materials and vice versa. In summary of this point, the more consistent the subject material is in base form and/or experiences during any alteration process (printing, laminating, dyeing, painting, etc.), the more efficient the process of mimicking natural object LRV's typically is. Also note that for example construction techniques of subject a material creates more porous surfaces and densities are also beneficial. Knitting for example may be useful in mimicking a highly porous natural object versus a very tightly woven material of the same content. Note however that porosities of a targeted natural object should be mimicked if possible. So as targeted natural objects are less porous, so should be the targeted form of material being utilized in the subject material etc. to make the process more efficient and eventually effective.

In spite of these dynamics and regardless of how and of what a subject material or object designed to mimic a natural object is constructed (naturally, unnaturally etc.), all such approaches are contemplated to be within the scope of this disclosure.

The present disclosure provides a process of measuring the LRV of a natural object(s) and/or a natural environment(s) and then using this measured LRV figure as a "target" value. The process contemplates making the LRV of a material(s) match to this "target" LRV figure. The LRV of natural objects is "semi-constant" but hitting a specific LRV of materials to this targeted LRV figure can be a process of adjustment of varying dynamics of the material being considered.

The present disclosure contemplates all reasonable methods of measuring LRV of various objects, inclusive of all types of LRV, and also inclusive of all methods to adjust the LRV (and all types of LRV) in the materials being developed and therefore potentially being adjusted.

FIG. 1 depicts an article of manufacture 100 in accordance with the present disclosure. Article 100 includes a surface 102. Over surface 102 a number of regions 104 are formed. Regions 104 may depict objects from a natural environment or the environment itself. In accordance with the present disclosure, the LRV of the real-world objects or environment depicted within regions 104 is measured. The surface treatments of regions 104 that depict the objection or environment are arranged or configured to have an LRV that matches the LRV of the real-world object or natural environment. The LRV of regions 104 may be adjusted or controlled based upon the LRVs of the various inks and other surface treatments (e.g., waterproofing, sealants, and the like) that may be formed over a surface of regions 104. The LRV of regions 104 may also be controlled or adjusted based on the LRV attributes of the underlying materials (e.g., fabrics, plastics, and the like) of regions 104. For example, in a garment, the LRV of regions 104 may be controlled by controlling the flocking or texture of fabrics making up regions 104. In this disclosure the LRV values matching may mean that the LRV values fall within 1% of one another. Though in other embodiments, the LRV values matching may mean that they fall within 5%, 10% or 30% of one another. In various embodiments, the article of manufacture 100 may include articles of clothing or other fabric-based articles. Alternatively, the article of manufacture 100 may include a hard good, such as binoculars, coolers, rifles, and the like.

In another embodiment, a camouflaged article of manufacture may include surfaces having LRVs matched to LRVs in a target environment, in which the camouflaged article does not depict specific real-world objects or environmental scenes. As such, an article camouflaged in accordance with the present disclosure may exhibit LRVs matched to a particular environment, without depicting specific objects (e.g., leaves, grasses, and the like) from that environment. For example, a garment camouflaged in accordance with this disclosure may not exhibit substantial surface ornamentations or patterns and may instead achieve its camouflage effect primarily by the matching of the LRV of the garment to the LRV of a target environment.

Figure 2:
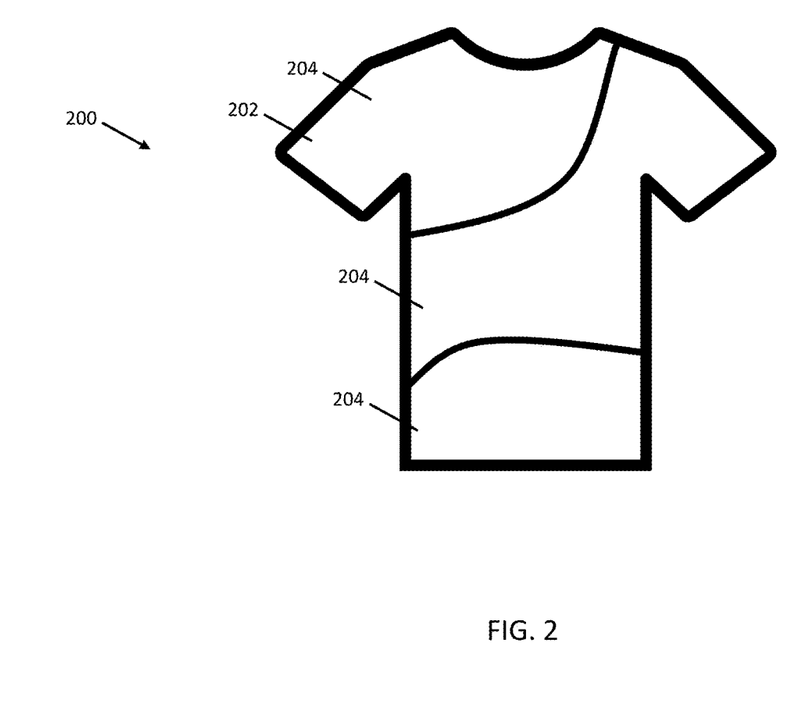
FIG. 2 depicts an article of manufacture including a garment having regions that can include combinations of materials and surface treatments having light reflectance values that are close to light reflectance values of real-world objects and environments.

To illustrate, FIG. 2 depicts an article of manufacture 200 in accordance with the present disclosure. Article 200 includes a surface 202. Over surface 202 a number of regions 204 are formed. In an embodiment, article of manufacture 200 may be configured to provide a camouflaging effect in a particular environmental scene. Accordingly, in accordance with the present disclosure, the LRV of real-world objects and the environmental scene itself may be measured. Then, in accordance with this disclosure, regions 204 of surface 202 are arranged or configured to have an LRV that matches the LRV of the real-world objects or natural environmental scene. The LRV of regions 204 may be adjusted or controlled based upon the LRVs of the various inks and other surface treatments (e.g., waterproofing, sealants, and the like) that may be formed over a surface of regions 204. The LRV of regions 204 may also be controlled or adjusted based on the LRV attributes of the underlying materials (e.g., fabrics, plastics, and the like) of regions 204. For example, in a garment, the LRV of regions 204 may be controlled by controlling the flocking or texture of fabrics making up regions 204. In this disclosure the LRV values matching may mean that the LRV values fall within 1% of one another. In other embodiments, the LRV values matching may mean that they fall within 5%, 10% or 30% of one another. In various embodiments, the article of manufacture 200 may include articles of clothing or other fabric-based articles. Alternatively, the article of manufacture 200 may include a hard good, such as binoculars, coolers, rifles, and the like.

Although article of manufacture 200 is depicted with three different LRV-matched regions 204, it should be understood that article of manufacture 200 may include any number of regions 204. For example, an article of manufacture 200 may be manufactured in accordance with the present disclosure in which the article 200 includes a single region 204 so that the entire surface of article 200 exhibits the same LRV characteristics.

Figure 3:
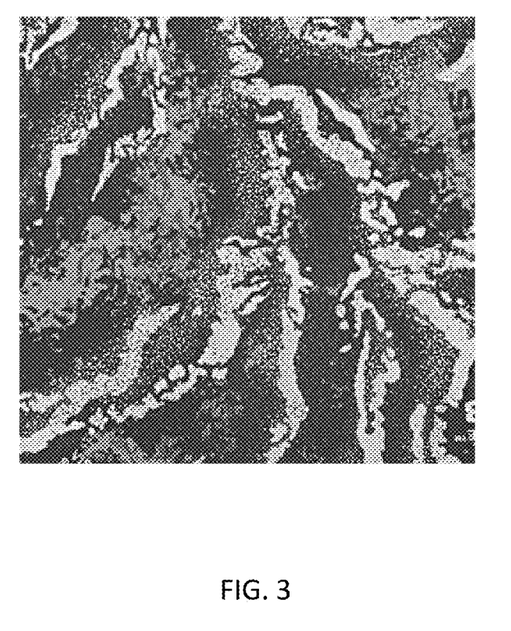
FIG. 3 depicts an example surface ornamentation that may be arranged on an LRV-matched surface of an article of manufacture.

In a real-world example of article 200, a particular environment for which article 200 is produced may be predominated by a particular type of tree that grows in the environment. As such, the LRV of that tree in the environment may be measured using various methods as described herein. Article 200 is then produced to include at least one region 204 (where region 204 may cover the entire article 200) having an LRV that matches the measured LRV for that particular type of tree. The LRV of the at least one region 204 may be controlled through the use of various surface treatments of region 204 (e.g., via use of particular inks, sealants, and other treatments) and/or through controlling of attributes of the underlying material making up region 204 (e.g., the material's porosity, flocking, and/or texture). With the LRV values matched, region 204 may include any type of surface ornamentation (e.g., a photo-realistic camouflage pattern, and abstract pattern (see, for example, the pattern depicted in FIG. 3), squiggly lines, or solid color(s)) as long as the region 204 maintains the matched LRV value. As such, the surface ornamentation can vary so long as the LRV of region 204 matches that of the measured LRV.

Figure 4A:
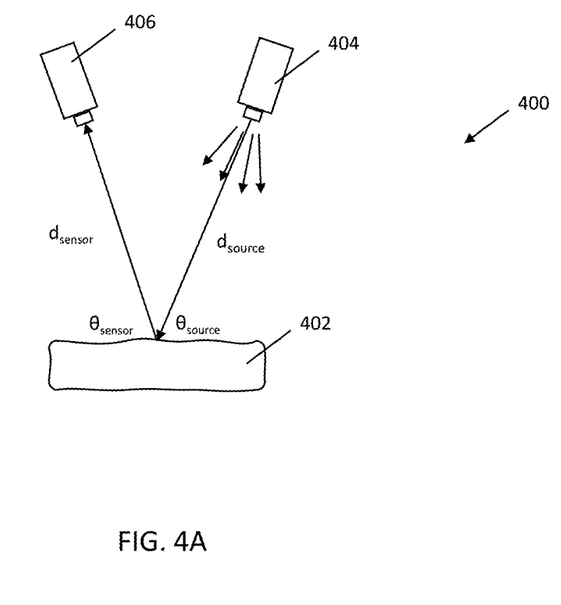
FIGS. 4A and 4B depict a system configured to prepare and evaluate camouflage surfaces in accordance with the present disclosure.
Figure 4B:
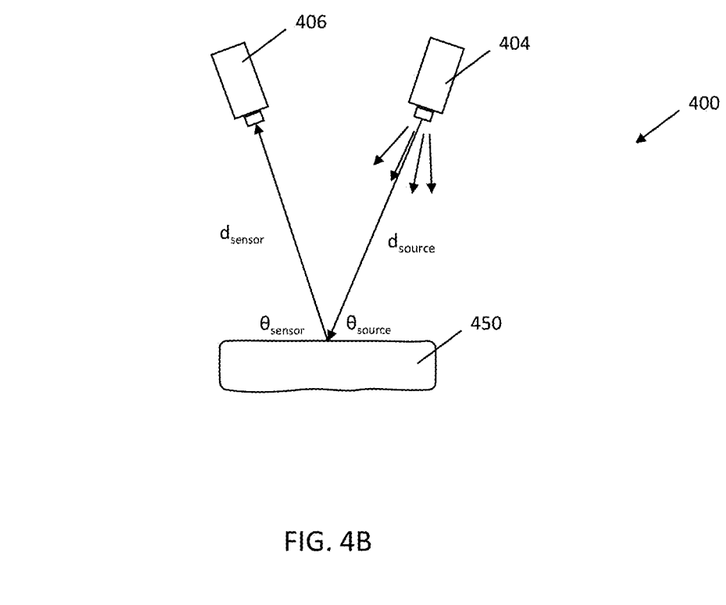

In an embodiment of the present system, a system and method for the preparation and evaluation of a camouflage surface are provided. Specifically, FIGS. 4A and 4B depict system 400 configured to prepare and evaluate camouflage surfaces in accordance with the present disclosure. In this embodiment, FIG. 4A depicts a system 400 configured to take sample LRV measurements of a real-world object 402. Real-world object 402 may include a single object (e.g., a piece of tree-bark, a bush or shrub, an animal fur, or the like) selected from a particular target environment or a collection of real-world objects 402 that together make-up a real-world scene in that target environment. System 400 includes a light source 404 configured to illuminate real-world object 402. The light source 404 may be configured to output light energy over a target spectrum or wavelength region of interest. For example, if the camouflage surface is configured to work well in outdoor brightly lit environments, light source 404 may be configured to output a light spectrum that approximates mid-day sunlight. In other embodiments, a camouflage surface may be developed for early-morning or dusk applications. In that case, light source 404 may output light that approximates the effects of sunlight at those times of day, where such light may be a different general temperature as compared to the mid-day sunlight. Similarly, if a camouflage surface is being developed for nighttime wear in the target environment, light source 404 may be configured to output a light spectrum that more approximates moonlight, starlight, or combinations thereof. In still other embodiments, camouflage may be developed for scenes or environment having a significant amount of reflected light (e.g., snow environments or watery environments). In that case, light source 404 may be adjusted to output light mimicking those environments. In various applications this may involve system 400 having a plurality of lights sources 404 distributed about the real-world object 402.

In some cases, the wavelength range of light output by light source 404 may include the non-visible spectrum (e.g., infrared or ultraviolet light). This may be suitable, for example, if developing a camouflage surface that is configured to be effective against animals whose eyes are primarily sensitive to light in those particular wavelengths. If that is the wavelength of interest, light source 404 may be configured to output light in those infrared (or near-infrared) or ultraviolet wavelengths. In various embodiments, light source 404 may be a single light source or may comprise a plurality of light sources each outputting portions of the wavelength of interest.

System 400 includes an LRV sensor 406 configured to measure a magnitude of light energy being reflected from real-world object 402 in a given spectrum or wavelength range. In various embodiments, LRV sensor 406 may include a spectrometer, such as an HDX-XR spectrometer that is configured to measure the spectrum of light energy that ranges from ultraviolet, through visible, to near infrared (or infrared), which may include light energy having wavelengths that range from roughly 200 nanometers (nm) to 1000 nm. In other embodiments, LRV sensor 406 may comprise a spectrometer configured to detect primarily the near infra-red spectrum, including light energy with wavelengths that range from roughly 1000 nm to 1600 nm.

In various other embodiments, however, it should be understood that LRV sensor 406 may comprise any suitable sensor device configured to detect light energy in the desired spectrum. Typically, LRV sensor 406 is configured to measure or detect light energy having wavelengths in a particular wavelength range, where that range is at least partially determined by the anticipated use of the camouflage. For example, if the camouflage is being developed so as to be difficult to detect by a particular animal (e.g., a particular deer species) or a group of animals (e.g., all deer) with visual systems that are sensitive to a particular range of light wavelengths, LRV sensor 406 may be configured to detect light energy in that same range of wavelengths. In other embodiments LRV sensor 406 may be configured to detect light over a large range of wavelengths, but where that range includes a narrower range of wavelengths for which the camouflage is being developed.

LRV sensor 406 is positioned a particular distance ($d_{sensor}$) away from real-world object 402 and at a particular angle $\theta_{sensor}$ with respect to the surface of real-world object 402. Similarly, light source 404 is positioned a particular distance ($d_{source}$) away from real-world object 402 and at a particular angle $\theta_{source}$ with respect to the surface of real-world object 402.

As described below, system 400 is configured to monitor the spectrum of light reflected from the surface of real-world object 402. In this manner the true light reflectance (or, conversely, absorption) characteristics of real-world object 402 can be precisely monitored to develop a light reflectance or absorption profile or "fingerprint" for the real-world object 402 that provides an indication of how much light the real-world object 402 reflects (or absorbs) at different wavelengths. It should be noted that in various embodiments of system 400, instead of a light reflectance profile LRV sensor 406 may output a light absorption profile that indicates how much light was absorbed (and not reflected) by the real-world object 402 instead. Light reflectance profiles and light absorption profiles are considered equivalent as both encode data describing the light reflectance attributes of an object at various wavelengths.

With the light reflectance profile generated, a camouflage surface can be generated to mimic that particular real-world object 402 or the scene represented by real-world object 402. This may involve incorporating a variety of different substrate materials into the camouflage surface (e.g., natural fibers such as Berber or cotton) and surface treatments (e.g., inks, dyes, and other color treatments) to generate a candidate camouflage surface ready for testing.

Once the candidate camouflage surface has been created, real-world object 402 can be replaced by the candidate camouflage surface 450 within system 400 (see, for example, FIG. 4B). Using the same techniques, the light reflectance profile of candidate camouflage surface 450 can be determined in the same conditions as originally used to determine the light reflectance profile of real-world object 402. The light reflectance profile of candidate camouflage surface 450 can then be compared to the light reflectance profile for real-world object 402 to determine whether the two are satisfactorily similar. If so, it may be determined that candidate camouflage surface 450 is a suitable approximation for real-world object 402. In that case, the techniques used to develop candidate camouflage surface 450 may be incorporated into various goods (e.g., clothing, hard goods, and the like) for use in the target environment.

Figure 5:
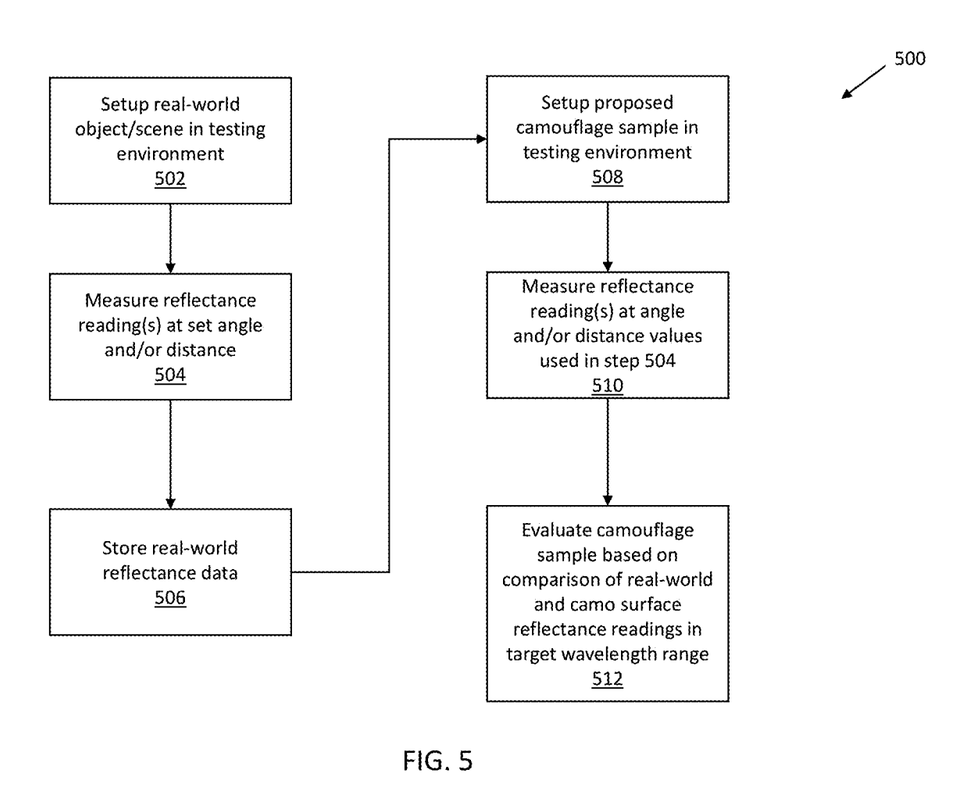
FIG. 5 is a flowchart depicting a method for using the system of FIGS. 4A and 4B to develop and validate the effectiveness of a camouflage surface for a target environment and, optionally, a target animal type.

FIG. 5 is a flowchart depicting a method 500 for using system 400 to develop and validate the effectiveness of a camouflage surface for a target environment and, optionally, a target animal type.

In step 502, system 400 is setup (as in the manner shown in FIG. 4A) to test the light reflectance properties for a particular real-world object 402 or scene. Typically, when developing a particular camouflage surface, this involves determining the typical illumination for the environment and operating light source 404 to generate an output light of similar magnitude and spectrum. If the camouflage surface is being developed to conceal objects from a particular animal type, light source 404 should be configured so as to generate output light that includes wavelengths to which that particular animal or animal type are sensitive.

Similarly, step 502 involves configuring LRV sensor 406 to measure a particular range of wavelengths. Again, if the camouflage surface is being developed to conceal objects from a particular animal type, LRV sensor 406 may be configured to measure light wavelengths in the range to which that animal or animal type is sensitive. In other embodiment, LRV sensor 406 may be configured to measure all visible wavelengths of light, or a greater range of wavelengths that may include near-infrared, infrared, and/or ultraviolet wavelengths.

Step 502 also involves carefully positioning each of light source(s) 404 and LRV sensor 406 at a precise distance away from real-world object 402 and at precise angles with respect to the surface of real-world object 402.

In step 504, light source 404 is illuminated and LRV sensor 406 is operated to measure light reflectance from real-world object 402. At the conclusion of step 504, LRV sensor 406 generates a light reflectance profile that is stored in a data repository in step 506.

In various embodiments, steps 502, 504, and 506 may be repeated with the light reflectance of real-world object 402 being measured in a variety of system 400 configurations. For example, multiple light reflectance profiles may be generated for real-world object 402 with each of light source 404 and LRV sensor 406 being positioned at different angles and distances with respect to the surface of real-world object 402. Similarly, the steps may be repeated in different lighting conditions (e.g., by generating multiple light reflectance profiles with light source 404 generating different types of light for each profile) and with LRV sensor 406 being configured to measure different light wavelengths in each profile.

After the light reflectance profile(s) of real-world object 402 have been generated, a similar process is used to test the light reflectance properties of the candidate camouflage surface. Specifically, in step 508 the candidate camouflage surface is positioned within the testing environment of system 400. Light source 404 and LRV sensor 406 are configured in the same manner as they were configured in step 502 for the real-world object 402. Specifically, each of light source 404 and LRV sensor 406 are configured to be the same distance away from the camouflage surface and at the same angle with respect to the surface of the camouflage surface. In step 510, light source 404 is illuminated and LRV sensor 406 is operated to measure light reflectance from the candidate camouflage surface. At the conclusion of step 510, a light reflectance profile (or multiple profiles if light reflectance data was captured for a number of different light source 404 and LRV sensor 406 placement configurations) has been generated.

In step 512, the light reflectance profile(s) of real-world object 402 can be compared to the light reflectance profile(s) for the camouflage surface to determine a degree of similarity and, therefore, the likelihood that the candidate camouflage surface will exhibit similar light reflectance properties to the real-world object 402 or scene. Any suitable statistical comparison approach may be utilized to compare the various light reflectance profiles. In various embodiments, for example, techniques such as the Sorensen-Dice distance, Jaccard distance, and other statistical techniques can be used to objectively determine the similarity of the data sets making up the light reflectance profiles of the real-world object 402 and candidate camouflage surface 450. If that similarity exceeds a predetermined threshold, it may be determined that the light reflectance attributes of the candidate camouflage surface 450 adequately matches that of the real-world object 402. In other embodiments, relatively simple approaches may be used to compare the light reflectance profiles. In an embodiment, an average value of the light reflectance profiles over the wavelength region of interest may be calculated. If those average values are within a threshold difference value of one another, it can be determined that the candidate camouflage surface 450 is an adequate match to the real-world object 402. The various threshold values utilized within this step 512 may be determined based upon experimentation so as to achieve an adequate level of reflectance profile match to achieve desired performance levels for the candidate camouflage surface 450.

Figure 6A:
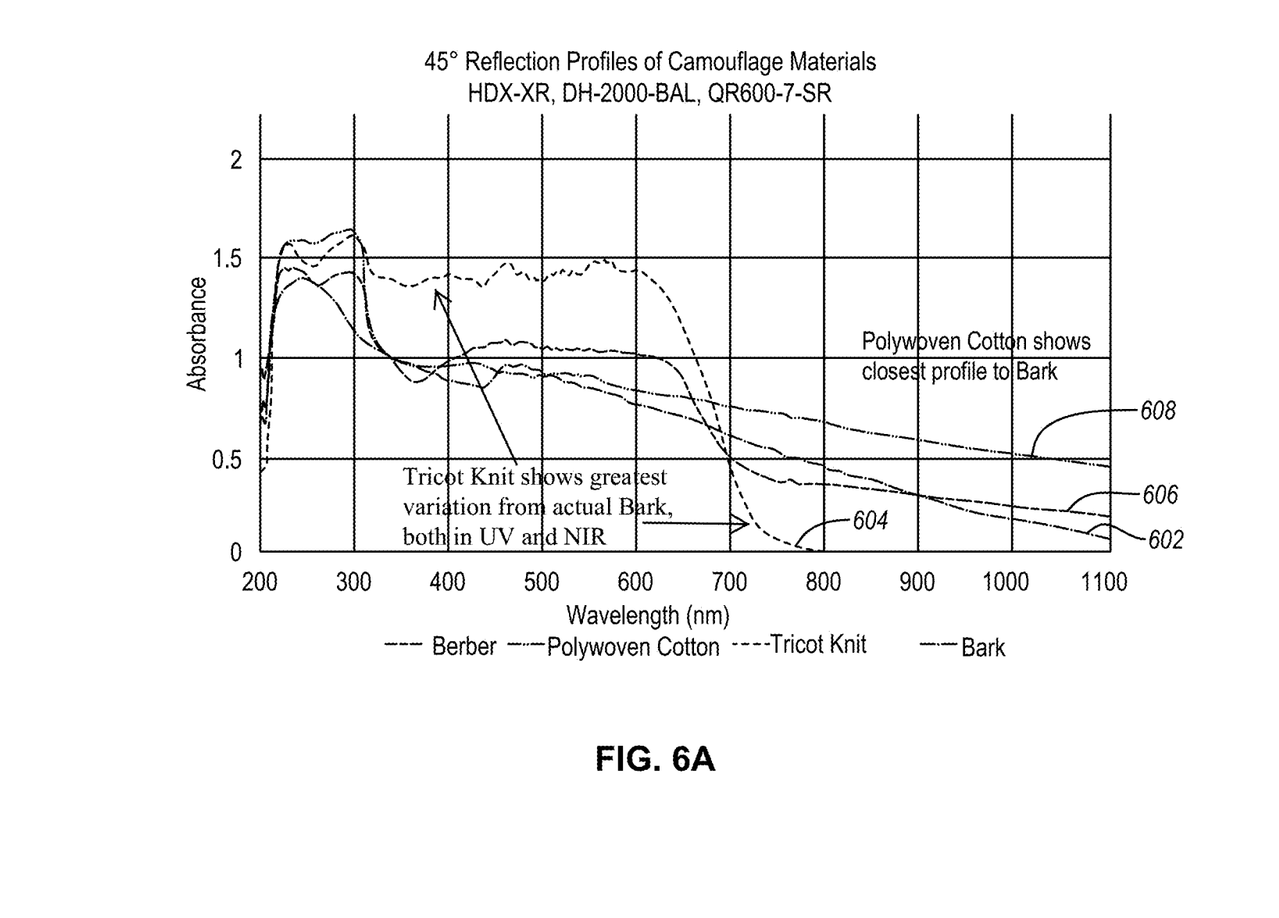
FIGS. 6A and 6B depict example light absorbance profiles that may be captured by the system of FIGS. 4A and 4B for a particular real-world object (i.e., a piece of tree bark) and a number of candidate camouflage surfaces.

FIG. 6A depicts example light absorbance profiles that may be captured by system 400 for a particular real-world object (i.e., a piece of tree bark) and a number of candidate camouflage surfaces (e.g., candidate camouflage surface 450). Within the chart of FIG. 6A, the horizontal axis represents wavelength, while the vertical axis represents a magnitude of absorbance (i.e., the opposite of, but directly correlated to, reflectance). Line 602 represents the absorbance profile for tree bark (e.g., real-world object 402), line 604 represents the absorbance profile for a candidate camouflage surface that incorporates a tricot knit fabric, line 606 represents the absorbance profile for a candidate camouflage surface that incorporates a Berber material, and line 608 represents the absorbance profile for a candidate camouflage surface that incorporates a polywoven cotton materials.

The light absorption profiles depicted in FIG. 6A were captured with LRV sensor 406 being at a 45-degree angle with respect to the surface of the bark and camouflage surfaces.

As seen in FIG. 6A, across the entire spectrum from 200 nm to 1100 nm it appears that line 608 (i.e., the profile for the polywoven cotton material) has the closest light reflectance/absorption properties to line 602 for the tree bark. As such, if it is desired to produce a camouflage surface that will perform well across the entire spectra of light, it may be possible to determine that the polywoven cotton material will provide a suitable substrate for that desired camouflage. It is also apparent that non-natural fabrics, such as tricot knit (as depicted by line 604) provide quite poor light reflectance profile matching and are therefore poorly suited to camouflage applications configured to mimic tree bark or other real-world objects and scenes. In other approaches, if the desire is to produce a camouflage configured to conceal items from animals that only sees specific wavelengths, comparison may instead be made between the portions of the light reflectance profiles that fall within that range of wavelengths, without regard to the portions of the light reflectance profiles that fall outside that range.

Figure 6B:
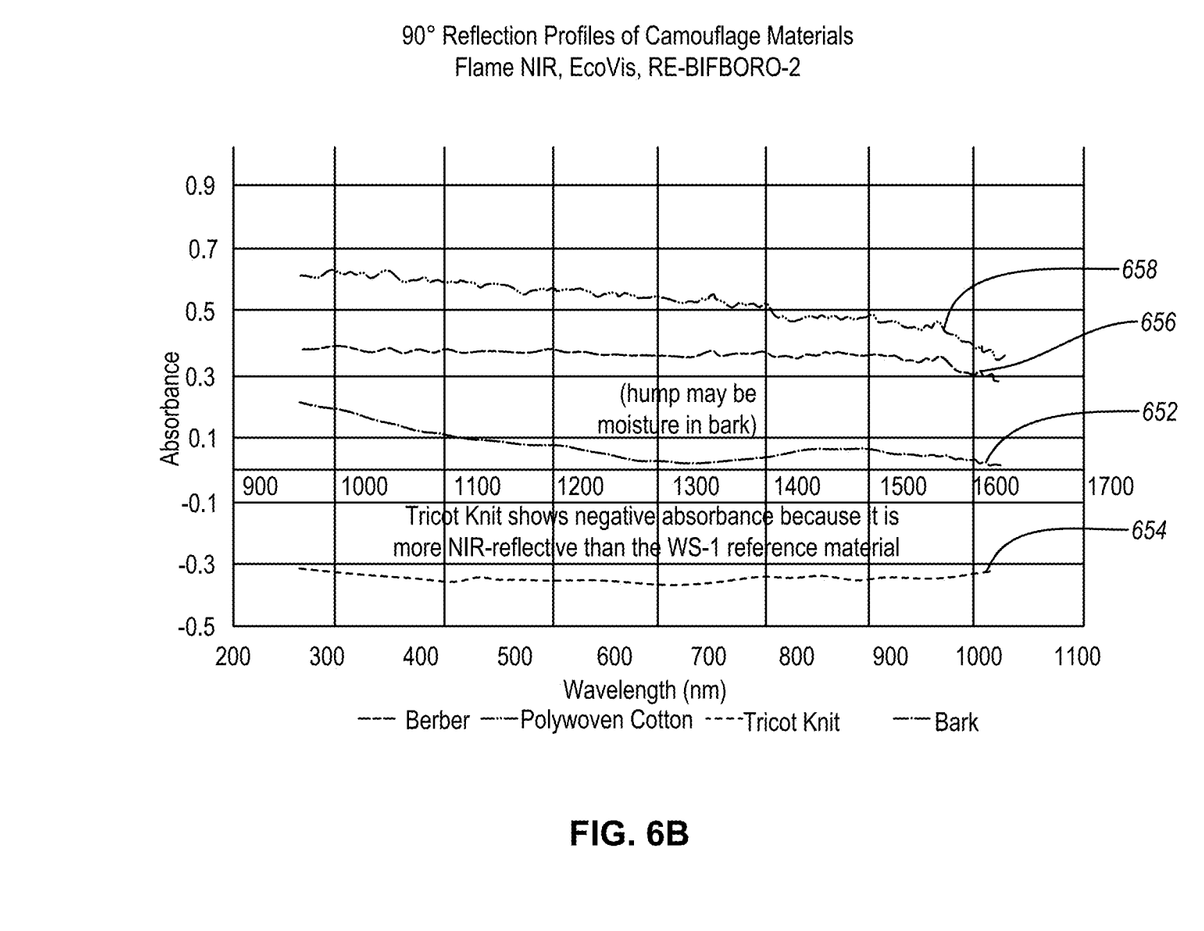

FIG. 6B depicts example light absorbance profiles that may be captured by system 400 for a particular real-world object (i.e., a piece of tree bark) and a number of candidate camouflage surfaces. Within the chart of FIG. 6B, the horizontal axis represents wavelength, while the vertical axis represents a magnitude of absorbance (i.e., the opposite of reflectance). absorbance. Line 652 represents the absorbance profile for tree bark (e.g., real-world object 402), line 654 represents the absorbance profile for a candidate camouflage surface that incorporates a tricot knit fabric, line 656 represents the absorbance profile for a candidate camouflage surface that incorporates a Berber material, and line 658 represents the absorbance profile for a candidate camouflage surface that incorporates a polywoven cotton materials.

The light absorption profiles depicted in FIG. 6B were captured with LRV sensor 406 being at a 90-degree angle with respect to the surface of the bark and camouflage surfaces.

As seen in FIG. 6B, across the entire spectrum from 900 nm to 1700 nm it appears that line 656 (i.e., the profile for the Berber material) has the closest light reflectance/absorption properties to line 652 for the tree bark. As such, if it is desired to produce a camouflage surface that will perform well across that spectrum of light (i.e., having wavelengths that vary from 900 nm to 1700 nm), it may be possible to determine that the Berber material will provide a suitable substrate for that desired camouflage. In other approaches, if the desire is to produce a camouflage configured to conceal items from animals that only sees specific wavelengths, comparison may instead be made between the portions of the light reflectance profiles that fall within that range of wavelengths.

It will be understood by one having ordinary skill in the art that construction of the described invention and other components is not limited to any specific material. Other examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the examples as shown is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method, comprising:
   positioning a light source a first distance away from an object, wherein light emitted from the light source strikes a surface of the object at a first angle;
   positioning a light reflectance sensor a second distance away from the object, wherein the light reflectance sensor is oriented at a second angle with respect to the surface of the object;
   causing the light source to illuminate the object;
   measuring, using the light reflectance sensor, a first light reflectance profile of the object;
   positioning the light source the first distance away from a candidate camouflage surface, wherein the light emitted from the light source strikes a surface of the candidate camouflage surface at the first angle;
   positioning the light reflectance sensor the second distance away from the candidate camouflage surface, wherein the light reflectance sensor is oriented at the second angle with respect to the surface of the candidate camouflage surface;
   causing the light source to illuminate the candidate camouflage surface;
   measuring, using the light reflectance sensor, a second light reflectance profile of the candidate camouflage surface; and
   comparing the first light reflectance profile to the second light reflectance profile to determine an efficacy of the candidate camouflage surface to mimic the object.

2. The method of claim 1, wherein the light reflectance sensor is configured to detect light having wavelengths from 380 nm to 740 nm.

3. The method of claim 1, wherein the light reflectance sensor is configured to detect light having wavelengths from 440 nm to 590 nm.

4. The method of claim 1, further comprising:
   positioning the light source a third distance away from the object, wherein light emitted from the light source strikes a surface of the object at a third angle;
   positioning the light reflectance sensor a fourth distance away from the object, wherein the light reflectance sensor is oriented at a fourth angle with respect to the surface of the object;
   causing the light source to illuminate the object;
   measuring, using the light reflectance sensor, a third light reflectance profile of the object;
   positioning the light source the third distance away from a candidate camouflage surface, wherein the light emitted from the light source strikes the surface of the candidate camouflage surface at the third angle;
   positioning the light reflectance sensor the fourth distance away from the candidate camouflage surface, wherein the light reflectance sensor is oriented at the fourth angle with respect to the surface of the candidate camouflage surface;

causing the light source to illuminate the candidate camouflage surface;

measuring, using the light reflectance sensor, a fourth light reflectance profile of the candidate camouflage surface; and comparing the third light reflectance profile to the fourth light reflectance profile to determine the efficacy of the candidate camouflage surface to mimic the object.

5. The method of claim 1, wherein comparing the first light reflectance profile to the second light reflectance profile includes calculating at least one of a Sørensen-Dice distance and a Jaccard distance between a first data set including the first light reflectance profile and a second data set including the second light reflectance profile.

* * * * *